United States Patent [19]

Ammeraal

[11] 4,127,374
[45] Nov. 28, 1978

[54] APPARATUS FOR MANUFACTURING THE CUPS OF A BRASSIERE FROM A FABRIC OF SYNTHETIC MATERIAL

[76] Inventor: Thomas C. M. Ammeraal, Zandweg 115, Wormer, Netherlands

[21] Appl. No.: 775,223

[22] Filed: Mar. 7, 1977

[51] Int. Cl.² .................. B29C 17/03; B29C 17/14
[52] U.S. Cl. .................. 425/289; 425/398; 425/400
[58] Field of Search ........... 425/289, 298, 400, 388, 425/394, 398, 395

[56] References Cited
U.S. PATENT DOCUMENTS

| | | | |
|---|---|---|---|
| 3,240,851 | 3/1966 | Sealova | 425/400 X |
| 3,527,858 | 9/1970 | Borxton et al. | 264/160 X |
| 3,739,052 | 6/1973 | Agres et al. | 425/388 X |
| 3,880,561 | 4/1975 | Ferro | 425/398 X |
| 3,981,670 | 9/1976 | Levy | 425/398 |

*Primary Examiner*—Robert L. Spicer, Jr.
*Attorney, Agent, or Firm*—Pollock, Vande Sande & Priddy

[57] ABSTRACT

Apparatus for manufacturing the cups of a brassiere from a fabric of synthetic material, said apparatus consisting of a frame with members for stretching and/or clamping and/or transporting the fabric between a mould which may be moved up and down, and a supporting rim cooperating with said mould and mounted therebelow, while further means are present to separate the cups, formed by the mould, from the remaining fabric.

5 Claims, 2 Drawing Figures

APPARATUS FOR MANUFACTURING THE CUPS OF A BRASSIERE FROM A FABRIC OF SYNTHETIC MATERIAL

BACKGROUND AND SUMMARY OF THE INVENTION

The present invention provides an apparatus for manufacturing the cups of a brassiere from a fabric of synthetic material, said apparatus comprising a frame with members which stretch, and/or clamp and/or transport the fabric between a mould, which may be moved up and down, and a supporting rim mounted below the mould and cooperating therewith, while further means separate the cups, formed by the mould, from the remaining fabric.

In operation, the fabric is clamped in a plane and intermittently moved on to be clamped, at successive stations, between the mould and the supporting rim, during which a cup is formed in the fabric by the oil-heated mould. Having moulded the cup into the stretched fabric, the mould is drawn back to some extent, after which air is drawn from above the supporting rim through the space between the cup and the mould and through the cup itself to cool it. After being cooled, the cup may be separated from the remaining fabric in various ways.

In one embodiment of the invented apparatus, the cup may be separated from the remaining fabric band by means of a cutting die cooperating with a supporting plate provided with an opening through which the mould may pass, which opening forms the supporting rim cooperating with the mould. In such embodiment, the cutting edge of the cutting die as well as the supporting plate and the supporting rim extend in a flat plane. This results in the disadvantage, that a perfect shape of the cups cannot be obtained. In a preferred embodiment of the invented apparatus, the supporting rim extends three-dimensionally. According to the invention, this three-dimensionally extending supporting rim, which cooperates with the mould, may be formed by the end-rim of a tube- or cylindrically-shaped element. On forming the cup according to this embodiment of the invention, the heated mould is moved downwardly against the fabric stretched between two clamping plates and then in abutment with the upper rim of the tube- or cylindrically-shaped element, during which the synthetic fabric adjusts itself to the mould, and finally is clamped between the mould and the spatially extending supporting rim.

Preferably the tube- or cylindrically-shaped element may be connected at the side facing away from the mould, to a suction pipe or duct through which the cups, after being separated from the starting fabric, may be extracted and carried off.

Separating the moulded cups along the spatially extending supporting rim would require a spatially extending cutting edge cooperating with a likewise spatially extending cutting plate. To overcome this problem, according to the preferred embodiment of the invented apparatus, a substantially closed and ring shaped, electrical heating element is mounted around the tube- or cylindrically-shaped element and means is provided to move the heating element up and down along the tubular element and past its upper rim. Having moulded the cup, the heated mould is drawn back from the cup which then is cooled by cooling air, after which the electrical heating element is brought upwardly against and past the fabric, as a result of which the cup is separated from the fabric band by the melting of the fabric at the locations of its contact with the heating element.

To clamp the fabric all round the mould, two cooperating clamping plates are provided, at least one of which is provided with a resilient or elastic layer. Preferably, the cooperating faces of the clamping plates are profiled. By applying these profiled clamping plates, by means of which the fabric to be processed may be clamped in a three-dimensional manner underneath the mould, a completely spatial shaping of the cup may be obtained.

Other objects and advantages will be apparent from the following description and from the drawings.

DETAILED DESCRIPTION OF THE PREFERRED EMBODIMENT

Figure 1:
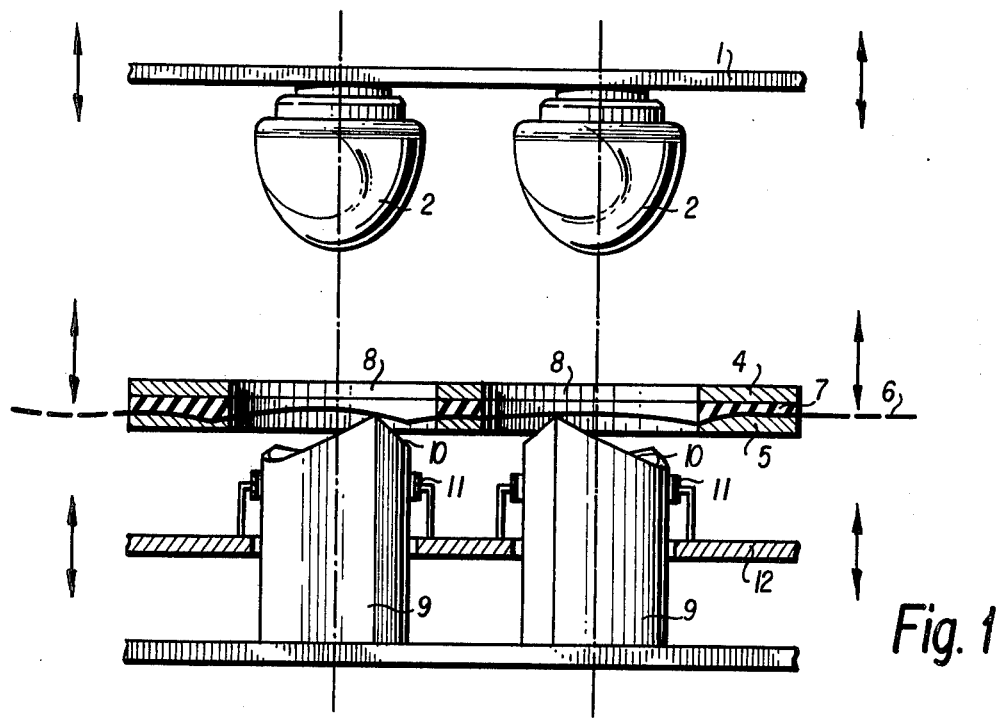
FIG. 1 is a section across the moulds and the members cooperating therewith of the invented apparatus.
Figure 2:
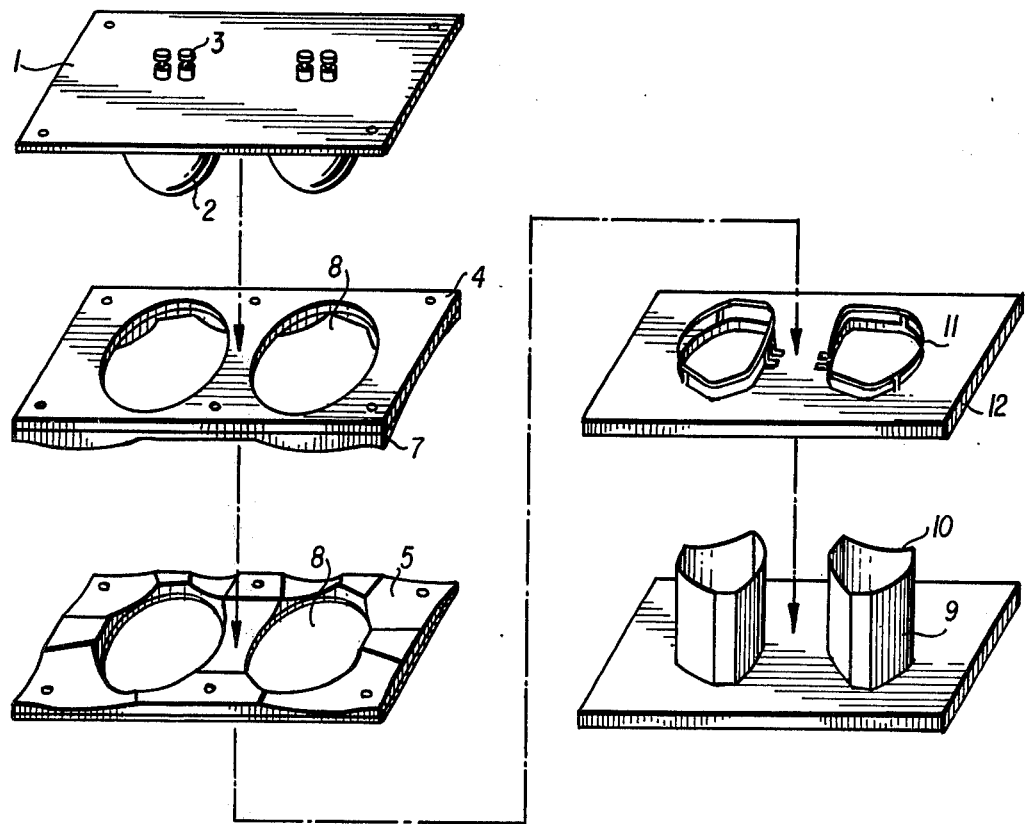
FIG. 2 is an exploded view of the members according to FIG. 1.

As is shown in the drawing, the apparatus comprises two moulds 2 mounted on a supporting plate 1 and movable up and down therewith.

The moulds are provided with connecting means 3 for supplying and draining off heating oil. Underneath the moulds two clamping plates 4 and 5 have been applied to clamp the fabric band 6. Both clamping plates are provided with profiled faces cooperating with each other, while the upper clamping plate 4 is provided on its lower side with a resilient or elastic layer 7. Underneath the moulds 2 the clamping plates are provided with openings 8 through which the molds may pass sufficiently into the tube-shaped elements 9 to permit the moulds to come into a fitting abutment with the three-dimensionally extending upper rims 10. Around the tube-shaped elements 9 ring-shaped, electrical heating elements 11 may be moved up and down with the supporting plate 12.

To manufacture the cups, the fabric band, whether or not preheated, is clamped between the clamping plates 4 and 5, after which the heated moulds 2 are moved downwardly through the openings 8 so that the fabric conforms its shape to that of the moulds and finally is clamped between the moulds and the upper rims 10 of the tube-shaped elements 9. Having formed the cups in this manner, the moulds are moved upwardly and air is drawn from above through the cups to the tube shaped elements 9 connected to a (not shown) pipe or duct.

After the cooling of the cups, the heating elements 11 are moved upwardly against the fabric stretched between the clamping plates 4 and 5 so that the formed cups are separated from the starting fabric and sucked off through the tube-shaped elements 9.

I claim:

1. Apparatus for manufacturing the cups of a brassiere from a fabric of synthetic material comprising:
    a single mold member contoured according to the desired contour of the cup,
    a tube-shaped element comprising a rim member having a three-dimensional configuration on the surface thereof facing said contoured mold member,
    means for clampingly supporting a web of the fabric in a stretched and non-planar condition between said mold and rim members, whereby movement of said mold member and said rim member together with said fabric web interposed therebetween causes said fabric to conform in shape over its major portion to the shape of said mold member and causes its rim portion to conform to the non-planar shape of said rim member.

2. The apparatus of claim 1 which further includes means for heating said mold member.

3. The apparatus of claim 1 in which a ring-shaped heating element slidably encircles said tubular member so as to be movable to a position contacting said fabric to separate the cups from the web.

4. The apparatus of claim 1 in which said supporting means comprises two clamping plates for supporting said fabric web in a non-planar configuration therebetween.

5. The apparatus of claim 4 in which at least one of said clamping plates supports on a surface thereof which faces the other clamping plate a resilient layer of material.

UNITED STATES PATENT AND TRADEMARK OFFICE
CERTIFICATE OF CORRECTION

PATENT NO. : 4,127,374
DATED : November 28, 1978
INVENTOR(S) : Thomas Cornelis Maria Ammeraal It is certified that error appears in the above—identified patent and that said Letters Patent are hereby corrected as shown below:

Priority Claim: Sep. 14, 1976     Netherlands     7610163

Signed and Sealed this

Fifteenth Day of May 1979

[SEAL]

Attest:

RUTH C. MASON
Attesting Officer

DONALD W. BANNER
Commissioner of Patents and Trademarks